United States Patent
Bourret et al.

(10) Patent No.: US 9,561,868 B2
(45) Date of Patent: Feb. 7, 2017

(54) METHOD AND DEVICE FOR VERTICALLY GUIDING AN AIRCRAFT DURING AN APPROACH OF A RUNWAY ALONG A LATERAL APPROACH TRAJECTORY

(71) Applicant: Airbus Operations (S.A.S.), Toulouse (FR)

(72) Inventors: Thierry Bourret, Toulouse (FR); Kenji Ahualle Horimoto, Sao Paulo (BR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/586,433

(22) Filed: Dec. 30, 2014

(65) Prior Publication Data
US 2015/0203214 A1   Jul. 23, 2015

(30) Foreign Application Priority Data
Jan. 3, 2014 (FR) .................................... 14 50026

(51) Int. Cl.
*B64D 45/04* (2006.01)
*G05D 1/06* (2006.01)
(Continued)

(52) U.S. Cl.
CPC .............. *B64D 45/04* (2013.01); *B64C 13/18* (2013.01); *G01C 23/005* (2013.01); *G05D 1/042* (2013.01); *G05D 1/0676* (2013.01)

(58) Field of Classification Search
CPC ....... B64C 13/18; B64D 45/04; G01C 23/005; G05D 1/042; G05D 1/0676
(Continued)

(56) References Cited

U.S. PATENT DOCUMENTS 3,177,484 A * 4/1965 Case, Jr. ............... G01S 13/913
244/187
3,743,221 A * 7/1973 Lykken ................ G05D 1/0676
244/180

(Continued)

FOREIGN PATENT DOCUMENTS

GB           2472497 A      2/2011
WO    WO-2007/067192 A2    6/2007

OTHER PUBLICATIONS

Non-Final Office Action for U.S. Appl. No. 14/586,461 dated Oct. 21, 2015.

(Continued)

*Primary Examiner* — Calvin Cheung
*Assistant Examiner* — Angelina Shudy
(74) *Attorney, Agent, or Firm* — Jenkins, Wilson, Taylor & Hunt, P.A.

(57) ABSTRACT

A method and device including a unit to extract a linear terrain profile stored in memory, a terrain height for a current distance of the aircraft, a unit for determining a current height of the aircraft with respect to the terrain, using at least one measurement taken by a radar altimeter, a unit for computing a first current altitude of the aircraft, using the terrain height and the current height, a unit for computing a second current altitude of the aircraft, corresponding to an altitude on an approach profile of the current position of the aircraft and a unit for computing the difference between the first and second current altitudes, the difference being transmitted to a guidance unit to vertically guide the aircraft.

15 Claims, 4 Drawing Sheets

(51) Int. Cl.
*B64C 13/18* (2006.01)
*G01C 23/00* (2006.01)
*G05D 1/04* (2006.01)

(58) Field of Classification Search
USPC .............................................................. 701/4
See application file for complete search history.

(56) References Cited

U.S. PATENT DOCUMENTS

| | | | | |
|---|---|---|---|---|
| 4,633,404 A * | 12/1986 | Greeson | ............... | G05D 1/0676 244/180 |
| 4,825,374 A * | 4/1989 | King | ................... | G05D 1/0676 244/186 |
| 4,954,837 A * | 9/1990 | Baird | ........................ | G01S 5/00 342/458 |
| 5,448,241 A * | 9/1995 | Zeoli | ........................ | G01S 13/90 342/123 |
| 6,055,477 A * | 4/2000 | McBurney | ............... | G01C 5/00 701/469 |
| 6,094,607 A * | 7/2000 | Diesel | ................... | G01C 21/165 342/355 |
| 6,232,890 B1 * | 5/2001 | Berlioz | .................. | G01C 23/00 340/970 |
| 6,389,354 B1 * | 5/2002 | Hicks | ................... | G01C 21/005 340/970 |
| 6,421,603 B1 * | 7/2002 | Pratt | ....................... | G01C 21/00 244/175 |
| 6,477,449 B1 * | 11/2002 | Conner | .................. | G08G 5/025 340/945 |
| 6,577,947 B1 * | 6/2003 | Kronfeld | ............... | G01C 21/00 701/301 |
| 6,690,296 B2 | 2/2004 | Corwin et al. | | |
| 6,711,479 B1 * | 3/2004 | Staggs | ................... | G08G 5/025 244/187 |
| 6,965,816 B2 | 11/2005 | Walker | | |
| 7,084,785 B2 | 8/2006 | Rouquette et al. | | |
| 7,145,501 B1 * | 12/2006 | Manfred | ................ | G01C 5/005 342/118 |
| 7,337,063 B1 * | 2/2008 | Oberg | ....................... | G01S 1/14 342/357.22 |
| 7,522,977 B2 | 4/2009 | Foucart et al. | | |
| 7,554,483 B2 | 6/2009 | Markiton et al. | | |
| 7,564,374 B2 * | 7/2009 | Winkler | ............... | G01C 23/005 340/971 |
| 7,599,766 B2 | 10/2009 | Ardila | | |
| 7,852,236 B2 | 12/2010 | Feyereisen et al. | | |
| 7,859,448 B1 | 12/2010 | Woodell et al. | | |
| 7,859,449 B1 | 12/2010 | Woodell | | |
| 7,920,943 B2 | 4/2011 | Campbell et al. | | |
| 8,112,188 B2 | 2/2012 | Rouquette | | |
| 8,121,783 B2 | 2/2012 | Bitar | | |
| 8,126,599 B2 | 2/2012 | Coulmeau et al. | | |
| 8,170,727 B2 | 5/2012 | Deker | | |
| 8,234,058 B1 | 7/2012 | Barber | | |
| 8,346,412 B2 | 1/2013 | Lacaze | | |
| 8,428,795 B2 * | 4/2013 | Caule | ..................... | B64C 25/426 340/951 |
| 8,457,872 B2 | 6/2013 | Deker | | |
| 8,494,693 B2 | 7/2013 | Murphy | | |
| 8,659,471 B1 * | 2/2014 | McCusker | ................ | G01S 7/22 342/118 |
| 8,718,915 B1 * | 5/2014 | Turcios | ................ | G01C 23/005 342/176 |
| 8,755,954 B1 * | 6/2014 | McCusker | ............ | G01S 13/426 340/970 |
| 8,781,654 B2 | 7/2014 | Giovannini | | |
| 8,788,128 B1 * | 7/2014 | McCusker | ............. | G08G 5/025 342/120 |
| 8,924,047 B2 | 12/2014 | Dewas et al. | | |
| 9,041,560 B2 | 5/2015 | Venkataswamy | | |
| 9,073,644 B2 | 7/2015 | Le Gall | | |
| 9,099,012 B2 | 8/2015 | Testrake et al. | | |
| 9,129,521 B2 | 9/2015 | Gannon et al. | | |
| 9,193,442 B1 * | 11/2015 | Young | ..................... | B64C 19/00 |
| 9,222,799 B1 * | 12/2015 | Bell | ........................ | G01C 23/00 |
| 9,243,910 B1 * | 1/2016 | Esno | ....................... | G01C 21/00 |
| 9,262,932 B1 * | 2/2016 | Barber | ................. | G08G 5/0021 |
| 9,310,222 B1 * | 4/2016 | Suiter | ................... | G01C 23/005 |
| 9,316,506 B1 * | 4/2016 | Aspen | .................... | G01C 23/00 |
| 9,342,988 B2 | 5/2016 | Bourret et al. | | |
| 9,390,559 B2 * | 7/2016 | Feyereisen | ............ | B64D 45/00 |
| 2002/0116097 A1 * | 8/2002 | Block | .................... | G01C 5/005 701/9 |
| 2003/0171856 A1 * | 9/2003 | Wilf | ........................ | G01C 5/005 701/16 |
| 2004/0186635 A1 * | 9/2004 | Manfred | .............. | G01C 25/005 701/4 |
| 2005/0182530 A1 * | 8/2005 | Murphy | .................. | G01S 19/15 701/16 |
| 2005/0187677 A1 | 8/2005 | Walker | | |
| 2006/0250280 A1 | 11/2006 | Chen et al. | | |
| 2007/0225876 A1 | 9/2007 | Caillaud et al. | | |
| 2008/0154447 A1 * | 6/2008 | Spinelli | ................. | G01C 21/20 701/7 |
| 2008/0269966 A1 * | 10/2008 | Markiton | ............... | G01C 23/00 701/16 |
| 2009/0153363 A1 * | 6/2009 | Lapp | ..................... | G01C 5/005 340/973 |
| 2012/0016539 A1 | 1/2012 | Krishnamurthy et al. | | |
| 2014/0257601 A1 | 9/2014 | Horne et al. | | |
| 2015/0120100 A1 * | 4/2015 | Sacle | ................... | G01C 21/20 701/18 |
| 2015/0151849 A1 * | 6/2015 | Labastie | ................ | B64D 43/02 701/7 |
| 2015/0307207 A1 * | 10/2015 | Meunier | .................. | G08G 5/02 701/4 |
| 2015/0317905 A1 * | 11/2015 | Bourret | ................ | G08G 5/0086 701/4 |
| 2016/0026189 A1 * | 1/2016 | Boada-Bauxell | .... | G05D 1/0676 348/144 |
| 2016/0046386 A1 * | 2/2016 | Eberle | .................... | B64D 45/08 701/7 |

OTHER PUBLICATIONS

French Search Report and Written Opinion for Application No. FR 1450026 dated Nov. 10, 2014.
Uijt De Haag M. et al.: "Flight Test Evaluation of Various Terrain Referenced Navigation Techniques for Aircraft Approach Guidance", Position, Location, and Navigation Symposium, 2006. IEEE/ION Coronado, CA. Apr. 25-27, 2006, Piscataway, NJ, USA, IEEE. p. 440-442; figures 1-3.
French Search Report and Written Opinion for Application No. FR 1450029 dated Nov. 17, 2014.
Notice of Allowance for U.S. Appl. No. 14/586,461 dated Mar. 4, 2016.

* cited by examiner

METHOD AND DEVICE FOR VERTICALLY GUIDING AN AIRCRAFT DURING AN APPROACH OF A RUNWAY ALONG A LATERAL APPROACH TRAJECTORY

CROSS-REFERENCE TO RELATED APPLICATION

This application claims priority to French Patent Application No. 14 50026 filed on Jan. 3, 2014, the entire content of which is incorporated by reference herein.

DESCRIPTION

Technical Field

The present disclosure relates to a method and device for vertical guidance of an aircraft, particularly a transport aircraft, during an approach. More particularly, the present disclosure is applicable to an approach to a landing runway of an airport along a lateral approach trajectory.

Background

There are various conventional systems assisting the guidance of an aircraft, particularly a civil transport airplane, during an approach with the aim of landing on a landing runway of an airport. In particular, a system of ILS (Instrument Landing System) type is known. Such an ILS requires ground installations to supply, for each landing runway, lateral (Localizer) and vertical (Glide) guidance axes along which the aircraft will be guided.

However, such an ILS is not installed in all airports, and for all landing runways. Consequently, to be able to be used in any airport, a vertical guidance device must be able to dispense with ground installations and use only on-board sensors for vertical guidance.

Moreover, it is known that aircraft are equipped with a navigation system generally using data from a satellite positioning system of GPS (Global Positioning System) type. Such a system has good lateral accuracy, which is adequate for many applications. However, its vertical component is not accurate enough for it to be used during an approach, as considered in the present disclosure, particularly by a civil transport airplane.

Consequently, no device exists that will provide accurate vertical guidance (with an accuracy in the same order as conventional vertical guidance using an ILS) during an approach, using only on-board structures or devices, i.e. without using ground installations.

SUMMARY

An aim of the present disclosure is to remedy this drawback. It relates to a method of vertical guidance of an aircraft during an approach to a landing runway along a lateral approach trajectory.

According to the disclosure herein, the method comprises successive steps of automatically and repeatedly:

a) determining a current distance corresponding to a distance in a lateral plane along the lateral approach trajectory, between a current position of the aircraft and a threshold of the landing runway;

b) extracting from a linear terrain profile defined along the lateral approach trajectory, a terrain height for the current distance, the terrain height being defined with respect to a level of the threshold of the landing runway;

c) determining a current height of the aircraft with respect to the terrain, using at least one measurement taken by at least one on-board radar altimeter at this current position;

d) computing a first current altitude of the aircraft, with respect to the level of the threshold of the landing runway, using the current height of the aircraft and of the terrain height;

e) computing a second current altitude of the aircraft, with respect to the level of the threshold of the landing runway, corresponding to an altitude on an approach profile for the current distance;

f) computing the difference between the first and second current altitudes; and g) using this difference to vertically guide the aircraft.

Thus, using the disclosure herein it becomes possible to determine using only conventional on-board structures or devices (radar altimeter etc.) as described below for example, a difference in altitude corresponding to a difference between a theoretical vertical position and a current vertical position of the aircraft, which is accurate enough to be able to be used in the implementation of vertical guidance of the aircraft by a conventional guidance unit, particularly an automatic pilot system or a flight director. This makes it possible to remedy the aforementioned drawback.

In the context of the present disclosure, the term "altitude" is understood to refer to the height with respect to the threshold of the landing runway, which is used as reference point (i.e. with an altitude considered to be zero at the threshold).

Advantageously, step a) can comprise sub-steps of:
determining the current position of the aircraft using measurements taken by an on-board receiver forming part of a satellite positioning system; and
computing the current distance, using this current position and a stored predetermined position of the threshold of the landing runway.

Moreover, in a first simplified embodiment, step c) comprises determining the current height to be a height measured by the radar altimeter. Furthermore, in a second preferred embodiment, step c) comprises determining the current height to be a hybrid height, by implementing the following successive sub-steps comprising:

c1) filtering, using a low-pass filter, a measurement taken by the radar altimeter in such a way as to obtain a first value;

c2) measuring the inertial vertical speed of the aircraft, in integrating this vertical speed, and in filtering it, using a high-pass filter, in such a way as to obtain a second value; and c3) summing the first and second values in such a way as to obtain the hybrid height.

Furthermore, advantageously, step e) comprises sub-steps comprising:

e1) computing an approach profile corresponding to a half-line having a predetermined angle with respect to the horizontal and comprising an endpoint that is situated on the landing runway at a predetermined distance with respect to the threshold of the landing runway; and e2) computing, as second current altitude, the altitude of this approach profile at a lateral distance from the threshold of the landing runway corresponding to the current distance.

The vertical guidance method can furthermore include one or more of the following features, taken individually or in combination:

step d) comprises summing the current height and the terrain height to compute the first current altitude;

a position correction on the aircraft, between an on-board receiver forming part of a satellite positioning system and an on-board radar altimeter, is implemented repeatedly using the current pitch angle of the aircraft, by referring to the measurements taken by the receiver and the measurements taken by the radar altimeter with respect to one and the same reference point situated on the aircraft;

an alert signal is emitted in the cockpit of the aircraft when the accuracy of the current position of the aircraft is below a predetermined accuracy threshold, the current position and the accuracy being determined using an on-board receiver forming part of a satellite positioning system;

the difference between the first and second current altitudes is expressed in the form of an angular deviation between two half-lines; and the difference is displayed on a screen of the aircraft cockpit, preferably on a primary piloting screen.

Furthermore, advantageously, the vertical guidance method includes an additional step comprises estimating a bias in the current distance of the aircraft and in correcting the current distance by this bias. Preferably, this additional step comprises sub-steps comprising, during the approach, in:

α) estimating the profile of the terrain overflown, using the measurements taken; and β) correlating this estimated profile of the terrain overflown with a terrain profile stored in memory, in such a way as to deduce a bias therefrom, the steps α) and β) being repeated iteratively taking into account at each iteration the bias deduced in the preceding iteration.

The present disclosure also relates to a device for vertical guidance of an aircraft during an approach to a landing runway along a lateral approach trajectory, the vertical guidance device including at least the following on-board units: a tracking unit making it possible to determine the current position of the aircraft, at least one radar altimeter and at least one guidance unit.

According to the disclosure herein, the vertical guidance device includes, moreover, the following on-board units:

a database storing a linear terrain profile defined along the lateral approach trajectory;

a first computing unit configured to determine a current distance corresponding to a distance in a lateral plane along the lateral approach trajectory, between the current position of the aircraft and a threshold of the landing runway;

a second computing unit configured to extract from the linear terrain profile stored in the database a terrain height for the current distance, determined by the first computing unit, the terrain height being defined with respect to a level of the threshold of the landing runway;

a third computing unit configured to determine a current height of the aircraft with respect to the terrain, using at least one measurement taken by the radar altimeter at this current position;

a fourth computing unit configured to compute a first current altitude of the aircraft, with respect to the level of the threshold of the landing runway, using the terrain height and the current height of the aircraft, received from the second and third computing units respectively;

a fifth computing unit configured to compute a second current altitude of the aircraft, with respect to the level of the threshold of the landing runway, corresponding to an altitude on an approach profile of this current position; and a sixth computing unit configured to compute the difference between the first and second current altitudes, received from the fourth and fifth computing units respectively, this difference being transmitted to the guidance unit that uses it to vertically guide the aircraft.

BRIEF DESCRIPTION OF THE DRAWINGS

The figures of the appended drawings will make it easier to understand how the disclosure herein can be produced. In these figures, identical reference numbers denote similar elements.

DETAILED DESCRIPTION

Figure 1:
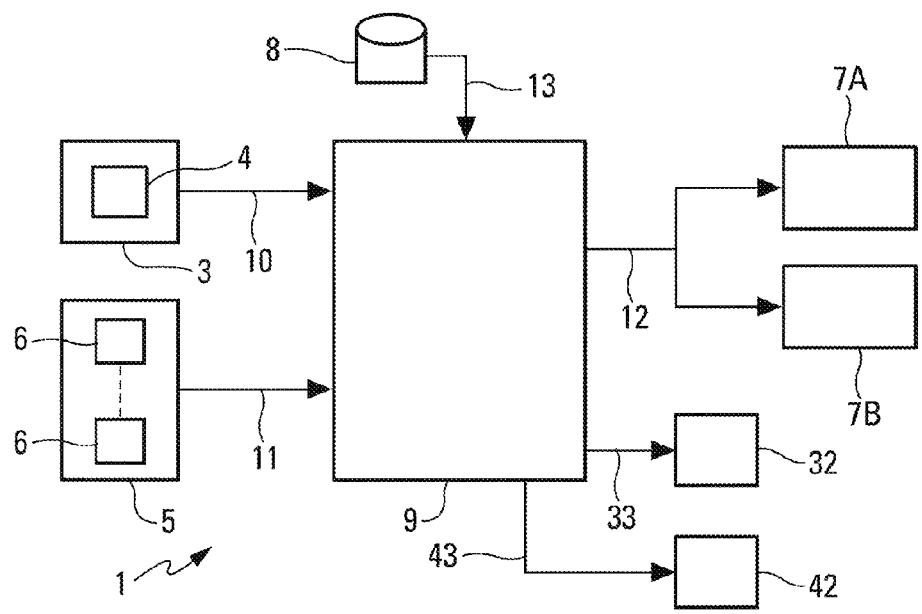
FIG. 1 is the block diagram of a vertical guidance device that illustrates an embodiment of the disclosure herein.
Figure 2:
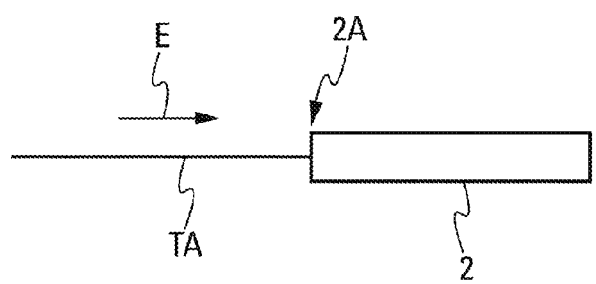
FIG. 2 shows a lateral approach trajectory schematically, in plan view.

The device 1 schematically represented in FIG. 1 and illustrating the disclosure herein is intended to at least vertically guide an aircraft AC, in particular a civil transport airplane, during an approach to a landing runway 2 along a lateral approach trajectory TA (FIG. 2). Although, in FIG. 2, the approach trajectory TA is represented as rectilinear, the disclosure herein is applicable to any type of approach trajectory comprising a combination of one or more rectilinear and/or curved segments.

To do this, this vertical guidance device 1 which is embedded in the aircraft AC includes:

a conventional tracking unit 3 making it possible and configured to determine the current position Pc of the aircraft AC. This tracking unit 3 comprises at least one receiver 4 forming part of a satellite positioning system, of GPS type for example;

an assembly 5 comprising at least one, but preferably a plurality of radar altimeters 6; and at least one conventional guidance unit 7A, 7B, particularly an automatic pilot system 7A and/or a flight director 7B.

According to the disclosure herein, this vertical guidance device 1 also includes a database 8 storing a linear terrain profile PT defined along the lateral approach trajectory TA, and a central unit 9 which is connected by connections 10, 11, 12 and 13 to the tracking unit 3, to the assembly 5, to the guidance unit 7A, 7B and to the database 8 respectively. In one embodiment, the database 8 can be integrated into the central unit 9.

Figure 3:
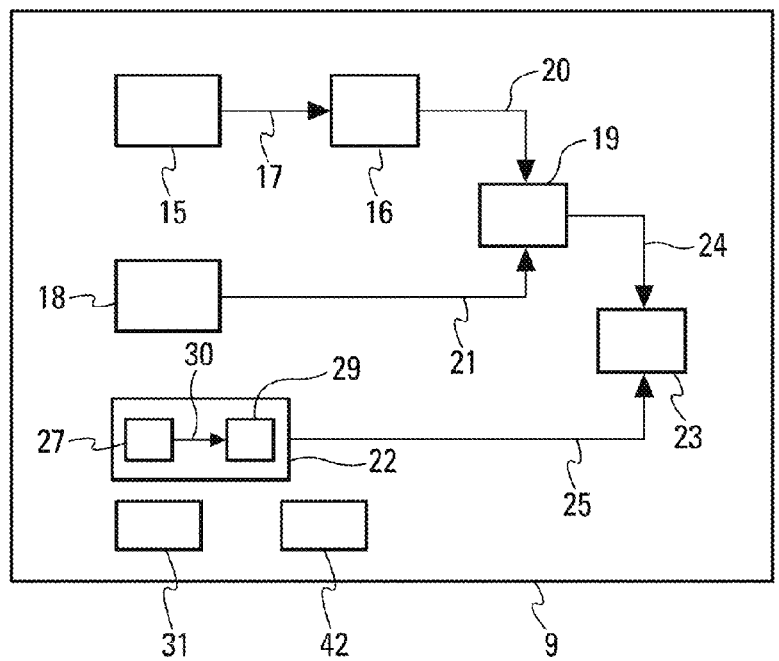
FIG. 3 is a particular embodiment of a central unit of a vertical guidance device.
Figure 4:
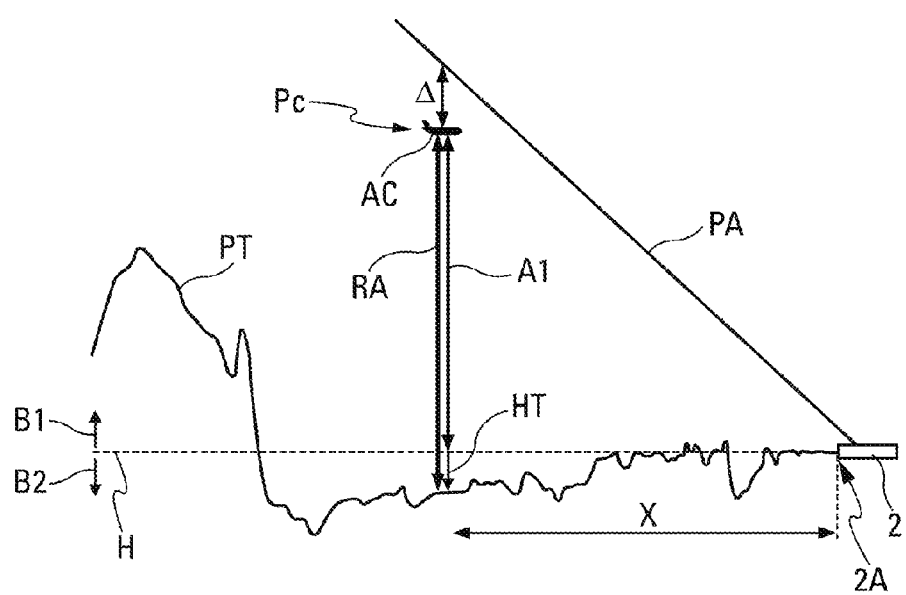
FIGS. 4 and 5 are graphs explaining the determination of the terrain profile for a particular embodiment of the disclosure herein.

According to the disclosure herein, the central unit 9 comprises, as represented in FIG. 3:

a computing unit 15 which is configured to determine a current distance X (FIG. 4) corresponding to a distance in a horizontal plane along the lateral approach trajectory TA, between the current position Pc of the aircraft AC and a threshold 2A of the landing runway 2;

a computing unit 16 which is configured to extract from the linear terrain profile PT stored in the database 8 a terrain height HT for the current distance X, determined by the computing unit 15 and received via a connection 17;

a computing unit 18 which is configured to determine a current height RA of the aircraft AC with respect to the terrain, using at least one measurement taken by at least one radar altimeter 6 of the assembly 5 at this current position Pc and received via the connection 11;

a computing unit 19 which is configured to compute a first current altitude A1 of the aircraft AC, using the terrain height HT and the current height RA of the aircraft AC, received from the computing units 16 and 18 via connections 20 and 21 respectively. The computing unit 19 produces the sum of the current height RA and the terrain height HT to compute the first current altitude A1. The terrain height HT is a positive value if it is directed upwards (as illustrated by an arrow B1 in FIG. 4) with respect to a new level H specified above, and this terrain height HT is a negative value if it is directed downwards (as illustrated by an arrow B2 in FIG. 4), as is the case for the example in this FIG. 4;

a computing unit 22 which is configured to compute a second current altitude A2 of the aircraft AC, corresponding to an altitude on an approach profile PA of this current position Pc, as specified below; and a computing unit 23 which is configured to compute the difference Δ between the first and second current altitudes A1 and A2, received from the computing units 19 and 22 via connections 24 and 25 respectively.

This difference Δ is transmitted via the connection 12 to the guidance unit 7A, 7B which uses it to vertically guide the aircraft AC in the conventional way.

Thus, the vertical guidance device 1 in accordance with the disclosure herein is in a position to determine using only on-board devices or structures (such as 3, 5, 8, 9) an altitude difference Δ corresponding to a difference between a theoretical vertical position and a current vertical position, which is accurate enough to be able to be used in the implementation of the vertical guidance of the aircraft AC using the guidance unit 7A, 7B.

In the context of the present disclosure, the term "altitude" is understood to refer to the height with respect to the threshold 2A (located at a level H) of the landing runway 2.

The terrain profile PT used and defined upstream of the runway for a given approach over a given airport, is a one-dimensional profile defined along the lateral approach trajectory TA. It is considered that all the aircraft that take the same approach will fly along the same lateral approach trajectory TA.

The computing unit 15 is configured to compute the current distance X, using the current position Pc and a stored predetermined position of the threshold 2A of the landing runway 2, by projection of these positions onto the ground (a horizontal plane), in particular of planar or curved shape in accordance with the Earth's curvature.

Figure 5:
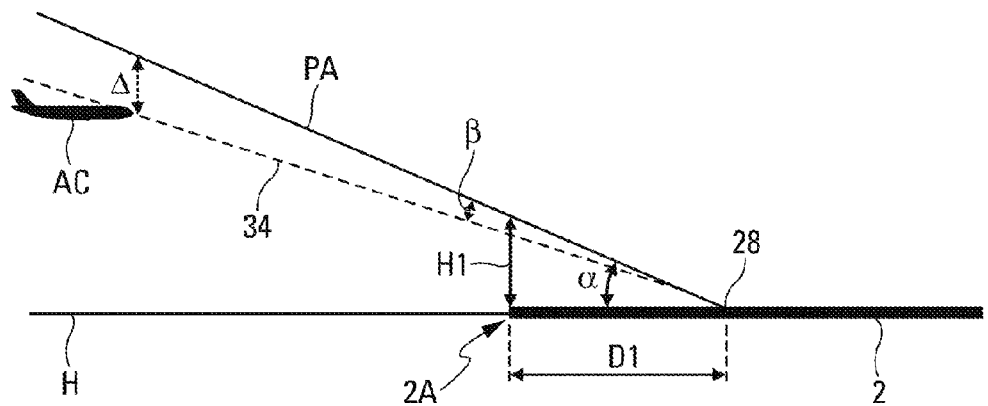

Moreover, the computing unit 22 comprises:

a computing unit 27 which is configured to compute an approach profile PA corresponding to a half-line having a predetermined angle α, preferably 3°, with respect to the horizontal H and comprising an endpoint 28 which is situated on the landing runway 2 at a predetermined distance D1 with respect to the threshold 2A of the landing runway 2, as represented in FIG. 5. Preferably, this approach profile PA (similar to an ILS beam) has a height H1 of 55 feet above the threshold 2A of the landing runway 2 for a standard approach; and a computing element 29 which is connected by way of a connection 30 to the computing element 27 and which is configured to compute, as second current altitude A2, the altitude of this approach profile PA at a distance from the threshold 2A of the landing runway 2 (towards upstream) corresponding to the current distance X.

Figure 6:
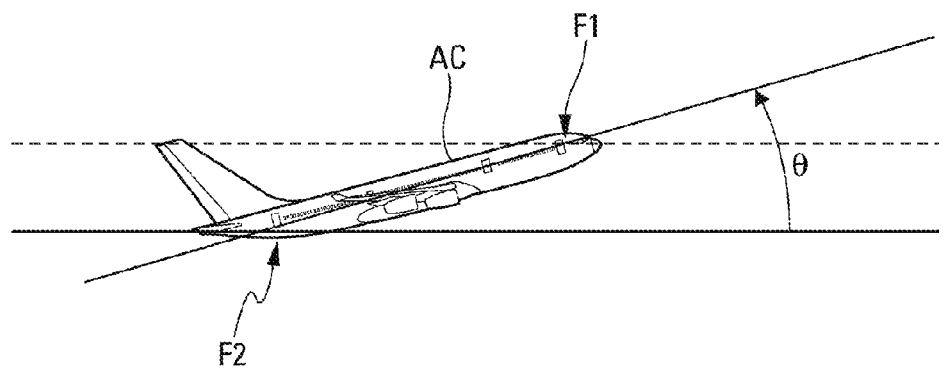
FIG. 6 shows the location on an aircraft of sensors used for implementing the disclosure herein.

Moreover, in general, a GPS receiver 4 of the tracking unit 3 is installed on the top towards the front of an aircraft AC such as a transport airplane, as indicated by an arrow F1 in FIG. 6, whereas a radar altimeter 6 is installed at the bottom towards the back, as represented by an arrow F2.

It is therefore suitable to bring the two measurements together in one and the same frame of reference. To do this, a position correction on the aircraft, between an on-board GPS receiver 4 and one or more on-board radar altimeters 6, is implemented repeatedly using the current pitch angle θ of the aircraft AC. To do this, the device 1 comprises a computing unit 31 (FIG. 3) which references the measurements taken by the receiver 4 and the measurements taken by the radar altimeter(s) 6 with respect to one and the same reference point situated on the aircraft AC, using a geometrical correction using the angle θ and the respective positions of the antennas (the positions of which are signalled by the arrows F1 and F2 on the FIG. 6). This reference point can be the center of gravity of the aircraft AC, the lowest point of a wheel of a landing gear, the position of the pilot, the position of an ILS antenna or any other point of the aircraft AC.

Moreover, the device 1 also comprises an alert unit 32 which is, for example connected by way of a connection 33 to the central unit 9 (FIG. 1) and which is capable of emitting an alert signal, of visual and/or sonic type, in the cockpit of the aircraft, when the accuracy of the current position Pc of the aircraft AC is below a predetermined accuracy threshold. The current position and the accuracy are determined, usually, using an on-board receiver 4 forming part of a satellite positioning system. The alert unit 32 includes a comparison element (not represented, and which is for example integrated into the central unit 9) which compares the accuracy value received from the receiver 4 to the stored accuracy threshold. Conventionally, the receiver 4 computes the accuracy of the position estimated mainly on the basis of the dispersion of all the signals received from the various satellites and the relative position of all the satellites.

Thus alerted, the crew can take the necessary measures (manual piloting, interruption of the approach etc.)

Furthermore, in a particular embodiment, the difference Δ between the first and second current altitudes A1 and A2 is expressed in the form of an angular deviation β between two half-lines, namely a half-line corresponding to the approach profile PA and a half-line 34 starting from the point 28 and passing through the position defined by the altitude A1 at the corresponding distance X as represented in FIG. 5.

In a particular embodiment, the difference Δ or the angular deviation β (when the separation is expressed in the form of an angular deviation) is displayed on a primary piloting screen 42, of PFD (Primary Flight Display) type, which is connected by a connection 43 to the central unit 9 (FIG. 1).

Furthermore, in a first simplified embodiment, the computing unit 18 simply uses, as current height RA, the height measured by the assembly 5 of radar altimeters 6 and received via the connection 11.

However, the computed vertical deviation can be affected by two errors and/or noise sources:

the terrain profile PT used being an approximation of the real profile, slight variations can appear; and the radar altimeter(s) 6 are subject to measurement noise and can detect moving objects such as motor vehicles or can be affected by vegetation in the environment.

Figure 7:
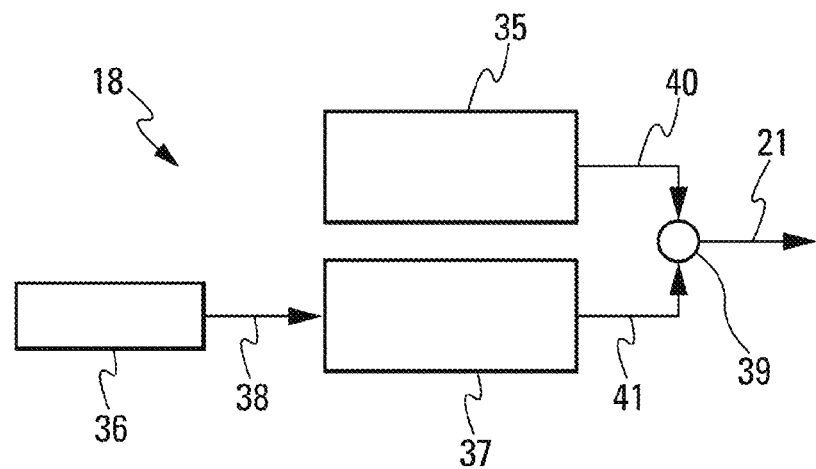
FIG. 7 is a particular embodiment of an element of the vertical guidance device.

Combined, these two effects can produce a relatively significant high-frequency noise signal, given the habitual speed of the aircraft. To reduce this high-frequency noise, in a second preferred embodiment, the computing unit 18 determines, as current height, a hybrid height. To do this, the computing unit 18 includes, as represented in FIG. 7:

a filtering element 35 to filter, using a low-pass filter, a measurement taken by the radar altimeter(s) 6 in such a way as to obtain a first value;

a computing element 36 to integrate the vertical speed of the aircraft AC, measured using conventional inertial sensors;

a filtering element 37 which is connected by a connection 38 to the computing element 35 and which is configured to filter the result of the integration, using a high-pass filter, in such a way as to obtain a second value; and a summing element 39 to sum the first and second values received via the connections 40 and 41 respectively, so as to obtain the hybrid height which is transmitted by the connection 21.

Figure 8:
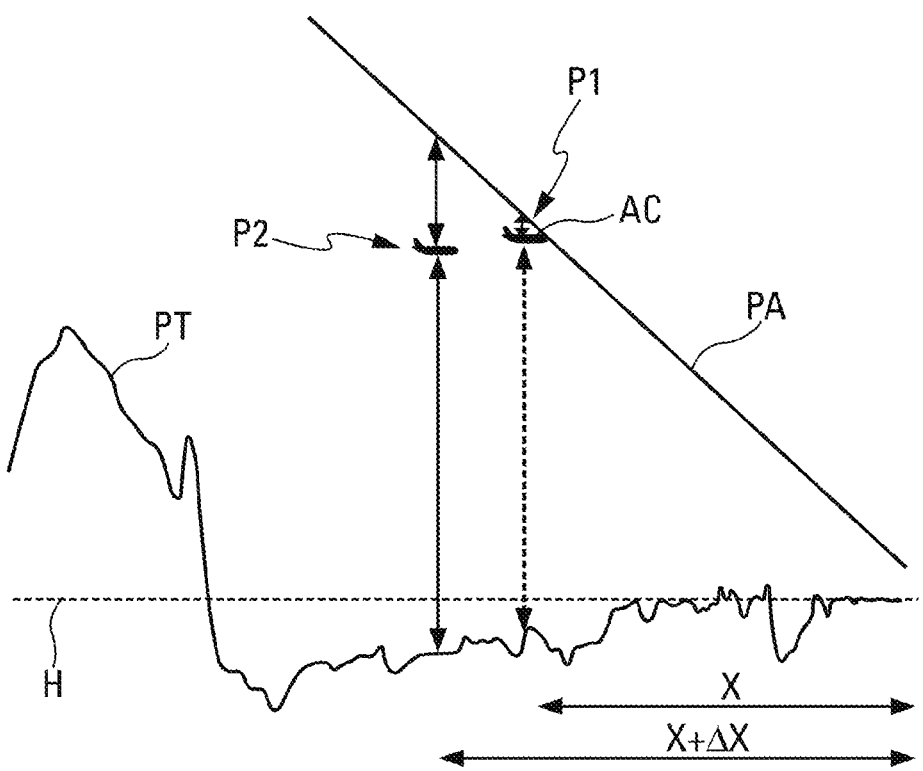
FIG. 8 is a graph explaining the consequences of a tracking error.

Moreover, as represented in FIG. 8, if the aircraft AC is found at a distance X (position P1) and the tracking unit 3 considers that it is found at a distance X+ΔX:

the first estimated current altitude of the aircraft AC is slightly erroneous, since the terrain profile PT is used at a slightly erroneous position; and the second current altitude defined with respect to the approach profile PA is also slightly erroneous.

To correct these errors, the vertical guidance device 1 includes, in addition, an additional unit 42 intended to estimate a bias 1 ΔX of the current distance of the aircraft AC and to correct the current distance of this bias ΔX. This additional unit 42 comprises structure(s) or device(s) for implementing steps, during the approach, of:

α) estimating the profile of the terrain overflown, using the measurements taken; and β) correlating this estimated profile of the terrain overflown with a terrain profile stored in memory in such a way as to deduce a bias therefrom, the steps α) and β) being repeated iteratively taking into account at each iteration the bias deduced in the preceding iteration.

The estimated terrain profile PT is correlated with a stored terrain profile. The correlation maximum supplies an estimate of the bias. Once this first estimate has been performed, a new estimated terrain profile can be recomputed, based on the stored profile of the radar altimeter which is completed by additional data. The estimated altitude of the aircraft thus becomes more and more accurate. The method is performed iteratively throughout the approach. Convergence occurs quickly as long as the overflown terrain profile PT varies sufficiently for the correlation to be able to supply a reliable estimate of the position error.

The present disclosure has many advantages, and notably:

the device 1 makes it possible to provide very accurate vertical guidance (in the order of the accuracy of a conventional ILS) of the aircraft AC during an approach, using only on-board sensors, which are installed in the usual manner on commercial airplanes, and therefore requires no ground installation. This solution thus has a reduced cost and can be used on all landing runways;

the terrain profile PT used being linear (i.e. with a single dimension along the lateral approach trajectory TA), the volume of data to be stored in the database 8 is limited so that the latter can be integrated into an on-board computer (central unit 9). Thus, no new computer needs to be installed on the aircraft AC for the implementation of the present disclosure; and the present disclosure is applicable to any type of approach, in particular a rectilinear approach or an approach with a curved section or sections, or a combination of rectilinear and curved sections.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method of vertical guidance of an aircraft during an approach to a landing runway along a lateral approach trajectory, the method comprising successive steps of automatically and repeatedly:

a) determining a current distance corresponding to a distance in a lateral plane along the lateral approach trajectory, between a current position of the aircraft and a threshold of the landing runway;

b) extracting from a linear terrain profile stored in a database and defined along the lateral approach trajectory, a terrain height for the current distance, the terrain height being defined with respect to a level of the threshold of the landing runway;

c) determining a current height of the aircraft with respect to the terrain height, using at least one measurement taken by at least one on-board radar altimeter at the current position;

d) computing a first current altitude of the aircraft, with respect to the level of the threshold of the landing runway, using the current height of the aircraft and the terrain height;

e) computing an approach profile corresponding to a half-line having a predetermined angle with respect to a horizontal and comprising an endpoint that is situated on the landing runway at a predetermined distance defined by a difference in distance between the endpoint and the threshold of the landing runway, wherein the half-line comprises a slope corresponding to a change in height above the runway divided by a change in distance along the horizontal at a declination rate determined by the predetermined angle;

f) computing a second current altitude of the aircraft, with respect to the level of the threshold of the landing runway, corresponding to an altitude on the approach profile for the current distance;

g) computing a difference between the first current altitude and the second current altitude; and h) using the difference to vertically guide the aircraft.

2. The method of claim 1, wherein step a) comprises sub-steps comprising:

determining the current position of the aircraft, using measurements taken by an on-board receiver forming part of a satellite positioning system; and computing the current distance, using the current position and a stored predetermined position of the threshold of the landing runway.

3. The method of claim 1, wherein step c) comprises determining the current height to be the current height measured by the at least one on-board radar altimeter.

4. The method of claim 1, wherein step c) comprises determining the current height to be a hybrid height, by implementing successive sub-steps comprising:
   c1) filtering, using a low-pass filter, a measurement taken by the radar altimeter to obtain a first value;
   c2) measuring the vertical speed of the aircraft, in integrating the vertical speed, and in filtering the vertical speed, using a high-pass filter, to obtain a second value; and
   c3) summing the first value and the second value to obtain the hybrid height.

5. The method of claim 1, wherein step d) comprises summing the current height and the terrain height to compute the first current altitude.

6. The method of claim 1, wherein a position correction on the aircraft, between an on-board receiver forming part of a satellite positioning system and the at least one on-board radar altimeter, is implemented repeatedly using a current angle of inclination and relative positions of antennas of the aircraft, referencing measurements taken by the on-board receiver and measurements taken by the at least one on-board radar altimeter with respect to a same reference point on the aircraft.

7. The method of claim 1, wherein step f) comprises computing, as the second current altitude, the altitude on the approach profile at a lateral distance from the threshold of the landing runway corresponding to the current distance.

8. The method of claim 1, wherein an alert signal is emitted in the cockpit of the aircraft when an accuracy of the current position of the aircraft is below a predetermined accuracy threshold, the current position and the accuracy being determined using an on-board receiver forming part of a satellite positioning system.

9. The method of claim 1, further comprising estimating a bias in the current distance of the aircraft and in correcting the current distance by the bias.

10. The method of claim 9, wherein estimating the bias comprises sub-steps comprising, during the approach:
    α) estimating a profile of a terrain overflown, using measurements taken; and
    β) correlating the profile of the terrain overflown, with the linear terrain profile stored in memory in such a way as to deduce the bias therefrom,
the steps α) and β) being repeated iteratively, taking into account at each iteration the bias deduced in a preceding iteration.

11. The method of claim 1, wherein the difference between the first current altitude and the second current altitude is expressed in a form of an angular deviation between two half-lines.

12. The method of claim 1, further comprising displaying the difference on a screen of a cockpit.

13. A device for vertical guidance of an aircraft during an approach to a landing runway along a lateral approach trajectory, the vertical guidance device comprising at least the following on-board units: a tracking unit comprising at least one receiver for determining a current position of the aircraft; at least one radar altimeter and at least one guidance unit; and
    the device further comprising on-board units comprising:
        a database storing a linear terrain profile defined along the lateral approach trajectory;
        a first computing unit configured to determine a current distance corresponding to a distance in a lateral plane along the lateral approach trajectory, between the current position of the aircraft and a threshold of the landing runway;
        a second computing unit configured to extract from the linear terrain profile stored in the database, a terrain height for the current distance, determined by the first computing unit, the terrain height defined with respect to a level of the threshold of the landing runway;
        a third computing unit configured to determine a current height of the aircraft with respect to the terrain height, using at least one measurement taken by the radar altimeter at the current position;
        a fourth computing unit configured to compute a first current altitude of the aircraft, with respect to the level of the threshold of the landing runway, using the terrain height and the current height of the aircraft, received from the second and third computing units respectively;
        a fifth computing unit configured to compute an approach profile corresponding to a half-line having a predetermined angle with respect to a horizontal and comprising an endpoint that is situated on the landing runway at a predetermined distance defined by a difference in distance between the endpoint and the threshold of the landing runway and a second current altitude of the aircraft, with respect to the level of the threshold of the landing runway, corresponding to an altitude on the approach profile of the current position; and
        a sixth computing unit configured to compute a difference between the first current altitude and the second current altitude, received from the fourth and fifth computing units, respectively, the difference being transmitted to the guidance unit that uses the difference to vertically guide the aircraft;
    wherein each of the first computing unit, the second computing unit, the third computing unit, the fourth computing unit, the fifth computing unit, and the sixth computing unit comprises a hardware processor; and
    wherein the half-line comprises a slope corresponding to a change in height above the runway divided by a change in distance along the horizontal at a declination rate determined by the predetermined angle.

14. The device of claim 13, wherein the guidance unit comprises at least one of: an automatic pilot system and a flight director.

15. An aircraft comprising:
    a vertical guidance device configured for vertical guidance of the aircraft during an approach to a landing runway along a lateral approach trajectory, the vertical guidance device comprising at least the following on-board units: a tracking unit comprising at least one receiver for determining a current position of the aircraft; at least one radar altimeter and at least one guidance unit; and
    the device further comprising on-board units comprising:
        a database storing a linear terrain profile defined along the lateral approach trajectory;
        a first computing unit configured to determine a current distance corresponding to a distance in a lateral plane along the lateral approach trajectory, between the current position of the aircraft and a threshold of the landing runway;
        a second computing unit configured to extract from the linear terrain profile stored in the database, a terrain height for the current distance, determined by the first computing unit, the terrain height defined with respect to a level of the threshold of the landing runway;

a third computing unit configured to determine a current height of the aircraft with respect to the terrain height, using at least one measurement taken by the radar altimeter at the current position;

a fourth computing unit configured to compute a first current altitude of the aircraft, with respect to the level of the threshold of the landing runway, using the terrain height and the current height of the aircraft, received from the second and third computing units respectively;

a fifth computing unit configured to compute an approach profile corresponding to a half-line having a predetermined angle with respect to a horizontal and comprising an endpoint that is situated on the landing runway at a predetermined distance defined by a difference in distance between the endpoint and the threshold of the landing runway and a second current altitude of the aircraft, with respect to the level of the threshold of the landing runway, corresponding to an altitude on the approach profile of the current position; and a sixth computing unit configured to compute a difference between the first current altitude and the second current altitude, received from the fourth and fifth computing units, respectively, the difference being transmitted to the guidance unit that uses the difference to vertically guide the aircraft;

wherein each of the first computing unit, the second computing unit, the third computing unit, the fourth computing unit, the fifth computing unit, and the sixth computing unit comprises a hardware processor; and wherein the half-line comprises a slope corresponding to a change in height above the runway divided by a change in distance along the horizontal at a declination rate determined by the predetermined angle.

* * * * *